Nov. 20, 1962 H. BLASZKOWSKI 3,064,320
JOINT AND SEAL MEANS
Filed June 29, 1959

INVENTOR.
HENRY BLASZKOWSKI
BY
ATTORNEY

# United States Patent Office 3,064,320
Patented Nov. 20, 1962

3,064,320
JOINT AND SEAL MEANS
Henry Blaszkowski, 7312 Bingham, Dearborn, Mich.
Filed June 29, 1959, Ser. No. 823,634
9 Claims. (Cl. 20—56.4)

This invention relates to methods and means for tightening gaskets against surfaces. By the methods and means herein disclosed and described, it is possible to (1) provide a tight gasket seal against a surface such as a panel or pane, (2) produce a stagnant space between panels in insulating windows, or (3) provide a means of joining two panels in edgewise relation.

In general, this invention involves uniform compression of one or more gaskets against the surface to be sealed, by means of a pair of rigid restraining members positioned externally of said gaskets and surface at opposite sides thereof and substantially parallel to said gaskets, one of said restraining members comprising a lever arm pivoted along a line which is substantially parallel to said gaskets and extends substantially the full length of said restraining member, said lever arm being constantly urged inwardly toward the opposite restraining member, by the constant application of a force against the other lever arm of said pivoted restraining member.

By means of this invention, it is possible to apply uniform pressure between a surface to be sealed and gasket means provided therefor, and this can be accomplished in a very simple manner. The use of the aforesaid lever arm and pivot line tends to distribute the force uniformly along the length of the gaskets and surface to be sealed even where the force itself is applied in a non-uniform manner such as by the tightening of screws. Preferably, however, the means of applying the force is of such nature as to be inherently uniform, as shown below.

An advantage of the present invention is that it permits the production of tight joints and seals in the field in an extremely simple and effective manner, and permits ready disassembly as well as assembly.

Another advantage of the present invention is that it permits of great flexibility, for example in that it may be used for the sealing of a single pane or panel or two or more parallel panes or panels for use as insulating windows or insulating curtain walls, as well as being adapted for use in joining panels in edgewise relation.

Still another advantage is that it is adapted not only to seal off air and other materials from flowing around the peripheries of the panels being sealed, but also to retard the flow of heat therearound, e.g. to prevent condensation on aluminum frames of windows.

Other objects and advantages will more fully appear in connection with the following description and drawings, wherein are disclosed preferred embodiments of the invention.

In the drawings.

In the drawings, similar numerals represent similar parts.

Figure 1:
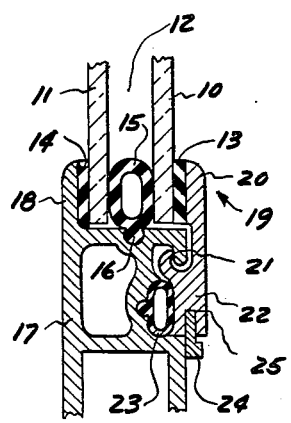
FIG. 1 is a fragmentary cross-sectional view of an insulating window utilizing the methods and means of the present invention.

Referring now to the drawings in detail, FIG. 1 shows a preferred embodiment in which one or more panes or panels may be sealed by the compression of gaskets provided therefor. In this figure, the numerals 10 and 11 represent, for example, panes of an insulating window provided with a stagnant air space 12 therebetween. Resilient gaskets 13 and 14 are provided, as shown, to seal the outer surfaces of panes 10 and 11, respectively. The stagnant space 12 between panes 10 and 11 is maintained by means of an additional gasket 15 placed therebetween, as shown. Said gasket 15 may comprise an inflatable tube which may be pre-inflated to a predetermined pressure in any known manner, such as by means of an air pump, before assembly of the unit, or it may constitute a hollow gasket of conventional type. It is also possible to utilize as the gasket 15 any other resilient gasket means which will permit substantial compression thereof as the panes 10 and 11 are urged towards each other. Gasket 15 is preferably provided with bulbous projection 16 projecting into a corresponding recess in the frame 17, so that it is readily retained in position in said frame. It is to be understood that gaskets 13, 14, and 15 extend around the entire periphery of the window. The window is assumed to be rectangular, as is conventional, so that the cross-section of each of the four sides of the window will be substantially the same as that shown in FIG. 1. If it is instead desired to utilize a window which has rounded corners, it is preferred nevertheless to utilize rectangular panels and rectangular gaskets, as in FIG. 1, producing the curvature of the corners of the windows by means of curved molding overlying the corners of the window.

Said panes 10 and 11 and gaskets 13, 14, and 15 are maintained under mutual pressure by means of rigid restraining members 18 and 19 positioned externally of said gaskets and panes at opposite sides thereof and substantially parallel to said gaskets. Restraining member 19 comprises a lever arm 20 in bearing contact with gasket 13 and running substantially the full linear length of said panes, pivoted along a pivot line 21 which is substantially parallel to said gaskets and extends substantially the full length of said restraining member 19. Restraining member 19 is urged inwardly about pivot line 21 by the application of an outward force to its other lever arm 22. The application of this force to lever arm 22 may be in any manner desired. For example it may be by the tightening of screws in known manner; however, a preferred means of applying such force, as shown in FIGURE 1, is by the inflation of an inflatable tubular member 23 which bears against the surface of lever arm 22 in such manner as to urge it outwardly. Inflatable tubular member 23 is inflated to a predetermined pressure by any known means, e.g. by means of an air pump. In this way a uniform force is exerted on lever arm 22 and, through the action of pivot line 21, a uniform pressure is also exerted by the lever arm 20 on the gaskets and panes. If desired the pressure in tubular member 23 may be maintained indefinitely, thereby maintaining indefinitely the tight seals of gaskets 13, 14, and 15 against panes 10 and 11. Alternatively, I may insert a wedge 24 into a corresponding slot 25 in lever arm 22, in the manner shown in the drawing. In this case, the continued application of force is caused by the bearing of wedge 24 against slot 25 in lever arm 22 and also against a fixed portion of the frame 17 as shown, inflatable tubular manner 23 in this case acting merely to move lever arm 22 sufficiently outwardly to expose slot 25 for the insertion of wedge 24 therein. Wedge 24 preferably runs substantially the full length of restraining member 19. Thus, in the embodiment shown in FIG. 1, a permanent tight seal may be obtained which is dependent upon the mechanical application of force, and which does not necessarily rely upon the continued exertion of force by an inflated tubular member.

It should be noted, further, that the embodiment shown in FIG. 1 may readily be adapted for the insertion of a single pane or panel in place of the two panes 10, 11 shown, or to the insertion of more than two panes or panels, as desired.

Figure 2:
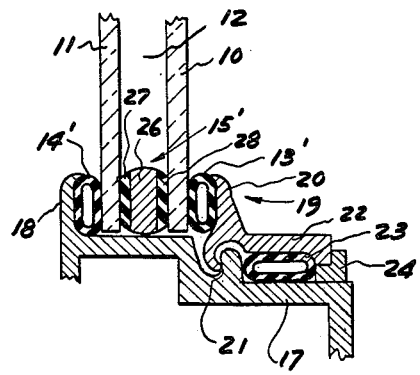
FIG. 2 is a fragmentary cross-sectional view showing a modification of the embodiment of FIG. 1.

Referring now to FIG. 2, there is here shown a modification of the embodiment shown in FIG. 1. In this second embodiment, the lever arm 22 is shown substantially perpendicular to lever arm 20. The principle of operation, however, remains substantially the same as in FIG. 1. An inflatable tubular member 23 is also shown. Inflation of tubular member 23 in this case moves lever arm 22 upwardly, thereby opening a sufficient gap between a fixed portion of frame 17 and lever arm 22 to permit the insertion of a wedge 24 therebetween. Also, in FIG. 2, I have shown a different type of gasket 15′, comprising a relatively inflexible spacing member 26 between two resilient gasket members 27 and 28. This type of gasket 15′ is preferred where the space between panes 10 and 11 is relatively large. I have also shown, in FIG. 2, gaskets 13′ and 14′ as inflatable tubes or as hollow gaskets, as desired. Thus, the combination of gaskets 13′, 14′, and 15′ will provide sufficient resiliency to allow the inward motion of restraining member 19.

Thus, in FIGS. 1 and 2 I have shown means and methods for sealing one or more panes or panels in such manner as to prevent the flow of air or other materials around the periphery of the panes or panels being sealed. Further, in the case of insulating windows or walls, as shown in FIGS. 1 and 2, I provide a truly stagnant space between the panes or panels, thereby providing excellent thermal insulating properties for said window. In addition, the insulating windows shown in FIGS. 1 and 2 possess another desirable feature, in that the transmission of heat around the periphery of said panes (as distinct from the transmission of heat through said panes) is also greatly diminished, since there is very little direct contact between the metallic portions at one side of the window and those at the other side. This advantage may be fully realized by using as the wedge 24 a non-metallic material such as rubber or plastic. Alternatively, wedge 24 may consist of a metallic material, but in this case it is preferred to provide thermal insulation between wedge 24 and frame 17. The advantage of preventing the transmission of heat around the periphery of the panes 10 and 11 is not merely the reduction of heat transfer, but also the prevention of condensation of moisture on frame 17, which is a common occurrence under certain conditions.

Figure 3:
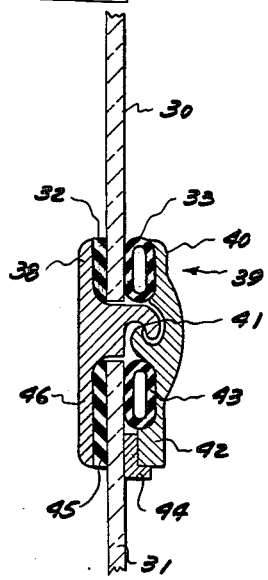
FIG. 3 is a fragmentary cross-sectional view showing the utilization of the methods and means of the present invention for joining two panels in edgewise relation.

Referring now to FIG. 3, there is here shown a means of joining two panels 30 and 31 in edgewise relation. Panel 30 is sealed by gaskets 32 and 33. Gasket 33 is shown as an inflated tube or a hollow gasket, so that the combination of gaskets 32 and 33 provides sufficient resiliency for the inward motion of restraining member 39 towards the opposed restraining member 38. This means of creating the seal between panel 30 and gaskets 32 and 33 are substantially the same in FIG. 3 as shown in FIG. 1. Restraining member 39 comprises a lever arm 40 pivoting about a pivot line 41. The second lever arm 42 is urged outwardly by an inflatable tubular member 43, as shown. A wedge 44 is inserted between lever arm 42 and panel 31 when a sufficient gap therebetween is opened by inflation of tubular member 43. At the same time, panel 31 is sealed by gasket 45 and inflatable member 43 which are maintained under compression by lever arm 42 and rigid restraining member 46. Again, it is not necessary that inflatable tube 43 remain inflated after the insertion of wedge 44. Thus, if desired, element 43 may be deflated, by allowing the escape of air therefrom, acting thereafter as a hollow gasket. Thus, the joint between panels 30 and 31 may be fully mechanical, not requiring the continued inflation of a tubular member. In the event that panels 30 and 31 comprise glass panes, wedge 44 should preferably consist of rubber, so as not to damage pane 31.

While I have described preferred embodiments of my invention, it is to be understood that various modifications in the details of construction may be made without departing from the spirit of the invention as defined in the following claims which are directed to the principal features of the invention rather than to the readily changeable details of construction.

I claim:

1. Means for providing a tight seal between a resilient gasket and a surface, comprising: a pair of rigid restraining members positioned externally of said gasket and said surface at opposite sides thereof and substantially parallel to said gasket, the first of said restraining members being fixed in position, the second of said restraining members comprising a pair of lever arms running substantially the full linear length of said gasket and being pivoted along a line intermediate said lever arms, the first of said lever arms being in bearing contact with said gasket; means for continually applying a predetermined force against the second of said lever arms in such direction as to cause the first lever arm to be urged inwardly against said gasket toward the aforesaid fixed restraining member, thereby pressing said gasket and surface together to create and maintain a tight seal therebetween; said pivot comprising a fixed fulcrum member having an undercut surface and an overhanging portion each running substantially parallel to said gasket substantially the full linear length thereof; and a hook-shaped projecting fulcrum-engaging member depending from said second restraining member and running substantially parallel to said gasket substantially the full linear length thereof, the end thereof being adapted to be freely received in said undercut surface to engage said fulcrum member in such manner that said overhanging portion of said fulcrum member intercepts a line through the end of said fulcrum-engaging member parallel to the direction of the aforesaid predetermined force, thereby pivoting said second restraining member for rotation about its line of contact with said fulcrum without requiring a pivot pin.

2. The means set forth in claim 1 for providing a tight seal between a resilient gasket and a surface, wherein said means of applying force against said second lever arm comprises: an inflatable tubular member restrained from motion at one side and bearing against said second lever arm at its other side, said tubular member being inflated to a predetermined pressure, thereby exerting a force against said second lever arm.

3. The means set forth in claim 1 for providing the tight seal between a resilient gasket and a surface, wherein said means of applying force against said second lever arm comprises: a fixed rigid member; and a wedge placed between and in bearing contact with said fixed rigid member and said second lever arm.

4. A multi-panel insulating partition, comprising: a multiplicity of substantially parallel, spaced-apart panels; resilient gasket means positioned between each pair of adjacent panels and also adjacent the outer surface of each of the outermost panels; a pair of rigid restraining members positioned externally of said gasket means and panels at opposite sides thereof and substantially parallel to said gasket means, one of said restraining members being fixed in position, the other of said restraining members comprising a pair of lever arms pivoted along a line intermediate said lever arms and running substantially parallel to said gasket means, the first of said lever arms being in bearing contact with said gasket means; and means for continually applying a predetermined force against the second of said lever arms in such direction as to cause the first lever arm to be urged inwardly against said gasket means toward the aforesaid fixed restraining member, thereby pressing said gasket means and panes together to create and maintain tight seals therebetween.

5. The multi-panel insulation partition set forth in claim 4, wherein said means of applying force against said second lever arm comprises: an inflatable tubular member restrained from motion at one side and bearing against said second lever arm at its other side, said tubular member being inflated to a predetermined pressure thereby exerting a force against said second lever arm.

6. The multi-panel insulating partition set forth in claim 4, wherein said means of applying force against said second lever arm comprises: a fixed rigid member; and a wedge placed between and in bearing contact with said fixed rigid member and said second lever arm.

7. Means for joining two panels in edgewise relation, comprising: a frame member adapted for the edgewise mounting of a pair of panels therein; resilient gasket means at each side of the first of said panels; resilient gasket means at one side of the second panel; an inflatable tubular member at the other side of said second panel; a fluid under superambient pressure contained in said inflatable tubular member; a pair of rigid restraining members positioned externally of said gasket means, inflatable tubular member, and panels in each case at opposite sides thereof and substantially parallel thereto, one of said restraining members in each case being fixed in position, the other of said restraining members being common to both panels and comprising a pair of lever arms pivoted along a line intermediate said lever arms and said panels and running substantially parallel to said panels; the pressure within said inflatable tubular member being sufficient to urge the lever arm in contact therewith outwardly and the other lever arm inwardly sufficiently to create and maintain tight seals of said gasket means and said panels.

8. Means for joining two panels in edgewise relation, comprising: a frame member adapted for the edgewise mounting of a pair of panels therein; resilient gasket means at each side of each of said panels; a pair of rigid restraining members positioned externally of said gasket means and panels in each case at opposite sides thereof and substantially parallel thereto, one of said restraining members in each case being fixed in position, the other of said restraining members being common to both panels and comprising a pair of lever arms pivoted along a line intermediate said lever arms and said panels and running substantially parallel to said panels; and a wedge inserted between one of said panels and the adjacent lever arm.

9. In a method of tightening a resilient gasket against a surface to be sealed thereby, wherein said gasket and surface are mounted between a pair of rigid restraining members, one of which comprises a pivoted first lever arm which is urged inwardly by the application of a predetermined force against the second lever arm thereof, the improvement comprising: urging said second lever arm outwardly by the inflation of an inflatable tubular member, thereby opening a space between said lever arm and a fixed rigid surface; and inserting a wedge in said opening, thereby maintaining continually a predetermined force against said second lever arm, and in turn causing said first lever arm to press the aforesaid gasket and surface together with sufficient force to create and maintain a tight seal therebetween.

References Cited in the file of this patent

UNITED STATES PATENTS

| | | |
|---|---|---|
| 2,356,433 | Roesch | Aug. 22, 1944 |
| 2,369,362 | Marziani | Feb. 13, 1945 |
| 2,607,310 | Evans | Aug. 19, 1952 |
| 2,700,196 | Panhard | Jan. 25, 1955 |
| 2,825,941 | Lux et al. | Mar. 11, 1958 |
| 2,848,762 | Peterson | Aug. 26, 1958 |

FOREIGN PATENTS

| | | |
|---|---|---|
| 388,891 | Great Britain | Mar. 9, 1933 |